(12) United States Patent
Watanabe (10) Patent No.: US 10,520,685 B2
(45) Date of Patent: Dec. 31, 2019

(54) OPTICAL CONNECTOR (71) Applicant: SANWA DENKI KOGYO CO., LTD., Tokyo (JP)

(72) Inventor: Yasuhiro Watanabe, Tokyo (JP)

(73) Assignee: SANWA DENKI KOGYO CO., LTD, Tokyo (JP)

( * ) Notice: Subject to any disclaimer, the term of this patent is extended or adjusted under 35 U.S.C. 154(b) by 0 days.

(21) Appl. No.: 16/183,778

(22) Filed: Nov. 8, 2018

(65) Prior Publication Data
US 2019/0235183 A1 Aug. 1, 2019

(30) Foreign Application Priority Data
Jan. 30, 2018 (JP) .................. 2018-013595

(51) Int. Cl.
*G02B 6/38* (2006.01)
(52) U.S. Cl.
CPC ......... *G02B 6/3887* (2013.01); *G02B 6/3821* (2013.01); *G02B 6/3825* (2013.01); *G02B 6/3885* (2013.01); *G02B 6/3893* (2013.01); *G02B 6/3831* (2013.01); *G02B 6/3882* (2013.01)

(58) Field of Classification Search
CPC .. G02B 6/3887; G02B 6/3825; G02B 6/3893; G02B 6/3885; G02B 6/3821; G02B 6/3831; G02B 6/3882
See application file for complete search history.

(56) References Cited

U.S. PATENT DOCUMENTS

| | | | | |
|---|---|---|---|---|
| 8,231,283 | B2 * | 7/2012 | Sabo | G02B 6/3885 385/120 |
| 8,740,479 | B2 * | 6/2014 | Shitama | G02B 6/255 385/95 |
| 8,814,444 | B2 * | 8/2014 | Ishikawa | G02B 6/3825 385/60 |
| 9,235,009 | B2 * | 1/2016 | Kato | G02B 6/3821 |
| 9,726,831 | B2 * | 8/2017 | Gniadek | G02B 6/3891 |
| 10,209,457 | B2 * | 2/2019 | Watanabe | G02B 6/3849 |
| 2009/0285534 | A1 | 11/2009 | Ishikawa | |
| 2017/0090126 | A1 | 3/2017 | Lu | |
| 2018/0335581 | A1 * | 11/2018 | Wong | G02B 6/381 |

FOREIGN PATENT DOCUMENTS

| JP | 2002-148485 A | 5/2002 |
|---|---|---|
| JP | 2003-215401 A | 7/2003 |

OTHER PUBLICATIONS

European Search Report issued in corresponding European Application No. EP18 207 345.2, dated Jun. 13, 2019.

\* cited by examiner

*Primary Examiner* — Ryan A Lepisto
(74) *Attorney, Agent, or Firm* — Bacon & Thomas, PLLC (57) ABSTRACT

Provided is an optical connector configured to be able to prevent a load caused by a bending stress of a protective boot from being concentrated on each of locking projections of a spring push on both right and left sides at the head thereof, thereby improving bending performance. At least a pair of locking holes (2*b*) and locking projections (6*b*) are respectively provided behind a locking hole (2*a*) at the front of a housing (2) and a locking projection (6*a*) at the head of a spring push (6) in such a manner as to distribute a load applied to the locking projection (6*a*) at the head of the spring push (6) with the aid of the rear locking projection (6*b*) at the rear thereof when an optical fiber cable (3*b*) is bent.

6 Claims, 13 Drawing Sheets

OPTICAL CONNECTOR

TECHNICAL FIELD

The present invention relates to an optical connector equipped with a mechanism for improving bending performance when optical fiber cables are connected to each other based on an MPO type push-pull system.

BACKGROUND ART

In the light of improvement of connection workability of an optical connector ferrule, it has been recently provided a so-called MPO connector (an optical connector having a structure in which a multi-fiber optical connector ferrule stipulated in the JIS-05982 standard is housed within a plastic housing).

<Conventional Structure>

Figure 9A:
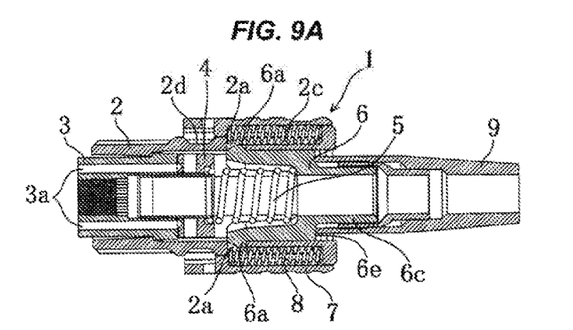
FIG. 9A is a cross sectional view in a state where a protective boot is not bent.
Figure 9B:
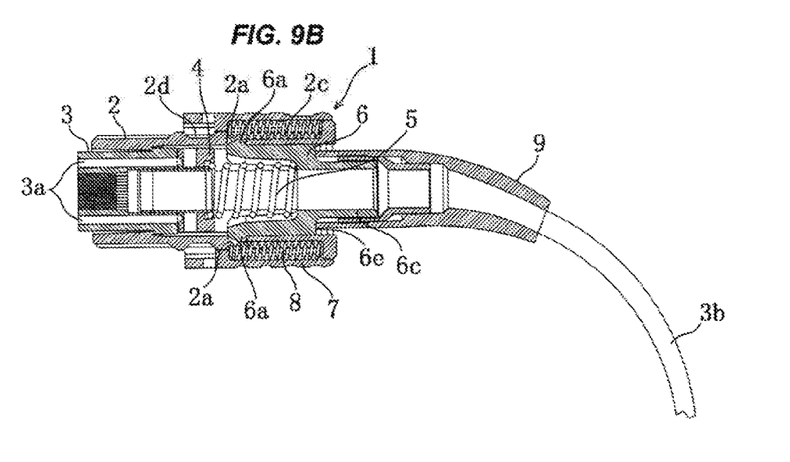
FIG. 9B is a cross sectional view of a state where the protective boot is bent.
Figures 10A, 10C:
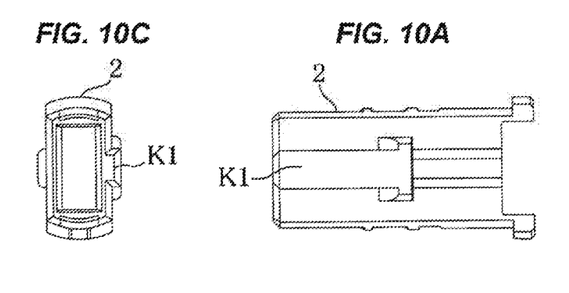
FIG. 10A is a plan view.
FIG. 10C is a front view.
Figure 10B:
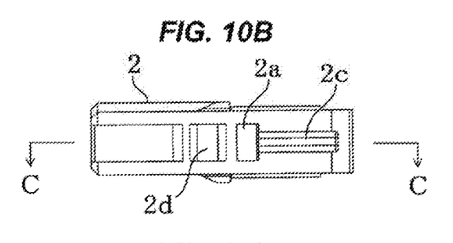
FIG. 10B is a side view.
Figure 10D:
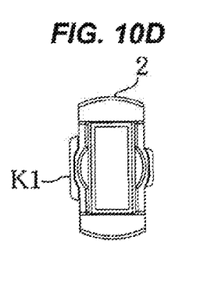
FIG. 10D is a rear view and FIG. 10E is a cross sectional view taken along line C-C in FIG. 10B.
Figure 10E:
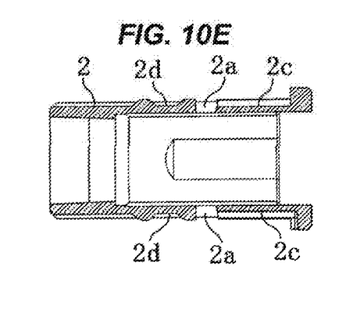
Figure 11:
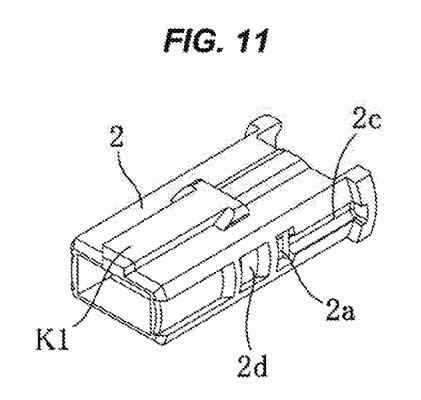
FIG. 11 is a perspective view showing an embodiment of the housing according to the prior art.
Figure 12A:
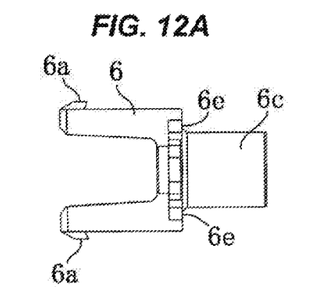
FIG. 12A is a plan view.
Figure 12B:
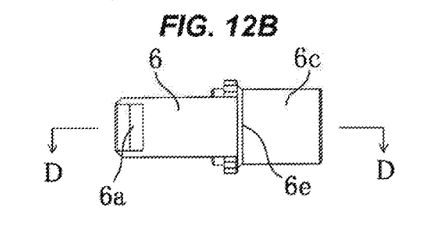
FIG. 12B is a side view.
Figure 12C:
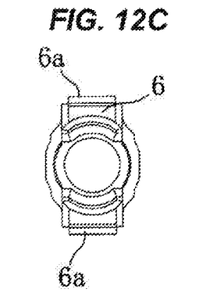
FIG. 12C is a front view.
Figure 12D:
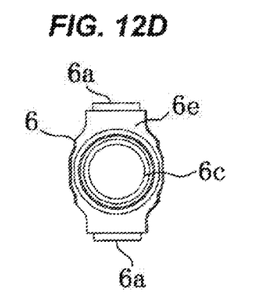
FIG. 12D is a rear view and FIG. 12E is a cross sectional view taken along line D-D in FIG. 12B.
Figure 12E:
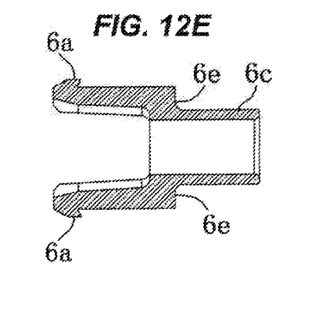
Figure 13:
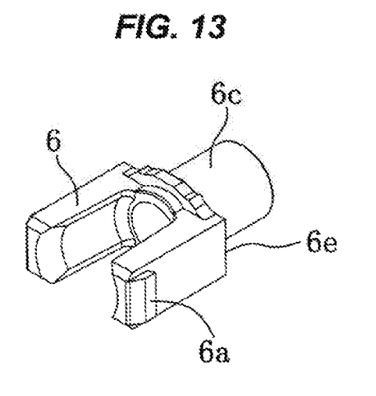
FIG. 13 is a perspective view showing an embodiment of a spring push according to the prior art.

Conventionally, as shown in FIGS. 9A and 9B, an MPO type optical connector 1 has a structure in which a ferrule 3 attached to the leading end of an optical fiber cable (an optical cord) 3b is housed in the head (the front end) of a sleeve-shaped housing 2. Further, a coil spring 5 elastically urging the ferrule 3 toward the front side of the optical connector 1 is provided within the housing 2.

Further, the MPO type optical connector 1 is provided with a housing 2 which is formed into a tubular shape having a substantially rectangular cross section, and is formed with a concave groove 2c for housing a spring on an outer surface of both sides at the rear of the optical connector 1, a tubular coupling 7 which is slidably provided within a movable range secured in an axial direction with respect to the housing 2, and is elastically urged toward the front side of the optical connector 1 by a spring 8 housed in the concave groove 2c of the housing 2, a spring push 6 which is attached to the rear end opposing to the front end in which the ferrule 3 of the housing 2 is provided, and a protective boot 9 which externally supprounds the rear end of the spring push 6. On an outer surface of the head (the front end) of the housing 2, a key projection K1 is formed, which is inserted along a key groove K2 formed on an inner surface of the coupling 7 (see FIGS. 11, 12A, 12B, 12C, 12D and 12E).

As shown in FIGS. 10A to 10E and 11, the housing 2 is formed into a tubular shape having a substantially rectangular cross section, and a locking hole 2a into which the spring push 6 is locked is oppositely formed on both sides at the rear of the housing 2. Reference numeral 2d in the drawings denotes an engagement groove, and the engagement groove 2d engages with a locking projection formed in an optical adapter that is a connection counterpart thereof.

In the meantime, the spring push 6 attached to the housing 2 by inserting thereinto is formed into a substantially U-shape in a plan view and can be inwardly bent each other, and a locking projection 6a to be locked into the locking hole 2a of the housing 2 is formed on an outer surface of both sides at the head of the spring push 6. Further, a fitting portion 6c having a stepped and cylindrical shape is provided at the rear of the spring push 6, and the leading end of the protective boot 9 is fitted to the fitting portion 6c via a tubular caulking ring 6d whose intermediate portion is stepwisely constricted. The protective boot 9 fitted to the fitting portion 6c abuts at its leading end against a stepped surface 6e at the base of the fitting portion 6c, thereby restricting a displacement of the protective boot 9 to a front direction of the spring push 6. Here, in a state where the locking projection 6a at the head of the spring push 6 is locked into the locking hole 2a at the front of the housing 2, the fitting portion 6c of the spring push 6 is positioned within the housing 2 closer to the front end side of the housing 2 than the rear end side thereof.

As mentioned above, the spring push 6 to be locked into the housing 2 retains a coil spring 5 lest the coil spring 5 comes off the housing 2. Here, the coil spring 5 presses the ferrule 3 in a fitting direction via a pin base 4.

The insertion of the spring push 6 into the optical adapter (not shown) of the connector main body 1 is achieved by pressing a portion positioned at the rear side farther from the coupling 7 of the connector main body 1, for example, the protective boot 9 toward the optical adapter while gripping the protective boot 9 with a hand and fingers of a worker.

Conventionally, the extraction of the spring push 6 from the optical adapter of the connector main body 1 is achieved by pulling in the coupling 7 to the protective boot 9 side against an elastic urging force of the spring 8.

Recently, the MPO type optical connector 1 has been under the pressure of necessity of downsizing itself with the advance of high densification and space saving in a server rack of a data center. The optical connector 1 downsized as above is housed in an extremely bent state when housed in the rack, and it is often the case that a load (a bending stress) is applied to the optical connector 1, particularly to the optical fiber cable 3b.

For example, the optical fiber cable 3b wired in a rear portion of the rack in which an optical communication device is accommodated is bent in the vicinity of a backboard of the optical communication device, and is connected to the optical fiber cable 3b at the optical communication device side. In a case where the optical fiber cable 3b is bent as above, it is generally said to necessary for maintaining a radius of curvature more than 30 mm, taking account of a light loss caused by the bending thereof.

For that reason, it has been conventionally taking measures such that the optical fiber cable 3b is inserted into the protective boot 9 having flexibility, and the aforesaid radius of curvature of the optical fiber cable 3b is maintained by a bending range allowed for the protective boot 9, at a portion at the rear of the housing 2 of the optical connector 1.

<Structure of Patent Literature 1>

In some cases, when the protective boot 9 is excessively bent, it is infrequently happens that the protective boot 9 comes off the optical connector 1. To avoid such a situation, it has been conventionally proposed an optical connector which can secure a bending radius of the optical fiber cable 3b with a reduced space taking account of a bending loss and breakage of the optical fiber cable 3b as disclosed, for example, in the Patent Literature 1.

Namely, in the aforesaid Patent Literature 1, the optical connector 1 has a receiving portion corresponding to the fitting portion 6c in a stopper 6 (a spring push), and the locking projection 6a in an extending portion on both sides of the stopper 6. Further, the leading end of the receiving portion forms the rear end of the stopper 6 (the spring push). Furthermore, an arm extends in a backward direction thereof through both sides of the receiving portion.

Between two arms, there is provided a hooking portion which prevents the protective boot 9 from being displaced toward the rear end side of the housing 2. The hooking portion is a substantially rectangular plate which is positioned on a surface in parallel with the rear end, and has at its center a substantially rectangular hole.

Further, when the protective boot 9 is attached from the rear side of the stopper 6 (the spring push), the dimensions of the hole in a height direction and a width direction are set to be greater than the dimensions of the receiving portion in a height direction and a width direction so that a leading end of the protective boot 9 can be fitted to the receiving portion. Furthermore, a stop surface corresponding to the fitting portion 6c for the protective boot 9 is provided opposing to the hooking portion. Here, a surface of the hooking portion opposing to the stop surface forms a hooking surface.

The protective boot 9 has convex portions 29c, each protruding substantially in an arc shape, on two peripheral surfaces of the leading end thereof in a width direction. A height and a width of the leading end of the protective boot 9 are formed to be somewhat smaller than a height and a width of the hole of the stopper 6 (the spring push). Further, the height of the leading end of the protective boot 9 including the convex portions is set to be higher than the height of the hole. A thickness (as seen from a length direction of the protective boot 9) of the convex portions is set to be somewhat thinner (smaller) than a distance between the stop surface of the protective boot 9 and the hooking surface. An inner periphery of the leading end of the protective boot 9 is formed to be somewhat smaller than an outer periphery of the receiving portion of the stopper 6 (the spring push).

The leading end of the protective boot 9 thus configured as above is fitted to the receiving portion of the stopper 6 (the spring push) from the arm side of the stopper 6 (the spring push) through the hole. The height of the leading end of the protective boot 9 including the convex portions is higher than the height of the hole of the stopper 6 (the spring push). However, the leading end of the protective boot 9 can pass through the hole because the protective boot 9 has flexibility, that is, the protective boot 9 is elastically deformable.

The leading end of the protective boot 9 fitted to the receiving portion through the hole of the stopper 6 (the spring push) does not easily come off the receiving portion because an inner periphery thereof is formed to be somewhat smaller than an outer periphery of the receiving portion. Further, the convex portions provided at the leading end of the protective boot 9 are positioned between the stop surface of the stopper 6 (the spring push) and the hooking surface, and hook the protective boot 9 to the stopper 6 (the spring push).

Therefore, the protective boot 9 is extremely hard to come off the optical connector 1 because the leading end of the protective boot 9 is fitted to the receiving portion of the spring push 6, and the convex portions of the protective boot 9 are hooked to the spring push 6 in the optical connector 1.

CITATION LIST

Patent Literature

PATENT LITERATURE 1: Japanese Patent No. 4128824

SUMMARY OF INVENTION

Technical Problem

However, in the aforesaid conventional prior art, a pair of (two) locking holes 2a are oppositely provided on both right and left sides at the front of the housing 2, and the same number of locking projections 6a (claw-like locking portions) are provided at the opposite portions of the spring push 6 (two in total). When the protective boot 9 is bent, for example, in a downward direction as shown in FIG. 9B, a load caused by a bending stress is concentrated on each of the locking projections 6a on both right and left sides at the head of the spring push 6. This invites the degradation of the locking projections 6a themselves, and it is likely that the protective boot 9 will come off the housing 2 together with the stopper 6 (the spring push).

Further, in the aforesaid case of the Patent Literature 1, the convex portions of the protective boot 9 are hooked to the stopper 6 (the spring push), thereby suppressing the bending of the protective boot 9 itself. However, the Patent Literature 1 does not provide any solutions to the load caused by the bending of the protective boot 9 applied to the stopper 6 (the spring push).

Accordingly, the present invention is made in view of the various circumstances immanent in the aforesaid Patent Literature 1. An object of the present invention is to provide an optical connector able to improve bending performance by preventing the load caused by the bending stress from being concentrated on each of the locking projections on both right and left sides at the head of the spring push when the protective boot is bent, for example, in a vertical direction or in a lateral direction. Further, the optical connector of the present invention is able to securely prevent the spring push (the protective boot) from accidentally coming off the housing, and to unlock simultaneously therewith the spring push by merely pushing the existing front side locking projection, as is conventionally done, when the spring push is disassembled from the housing.

Solution to Problem

In order to solve the problem mentioned above, according to the present invention, there is provided an optical connector comprising: a ferrule to which one end of an optical fiber cable is fixed; a housing which houses the ferrule in its head, extends a portion of the other end side of the optical fiber cable from the rear end thereof, and is provided in both sides at the front thereof with a locking hole; a coupling which is externally fitted slidably to the housing in its longitudinal direction, and is always elastically urged in a forward direction; a spring push which is internally inserted into the rear end of the housing so as to prevent the ferrule from coming off the housing, and is provided at its head with a locking projection to be locked into the locking hole at the front of the housing; a protective boot which extends from the rear end of the housing, with a leading end thereof engaged with the spring push, and has flexibility capable of partly surrounding a portion at the other end side of the optical fiber cable; the locking of the spring push to an elastic locking portion within an adapter being retained by advancing the coupling; and the locking of the spring push to the elastic locking portion within the adapter being unlocked to allow the spring push to be pulled out from the housing by retreating the coupling, wherein at least a pair of locking holes and locking projections are respectively provided behind the locking hole at the front of the housing and the locking projection at the head of the spring push, and wherein a load applied to the locking projection at the head of the spring push is distributed with the aid of the locking projection at the rear thereof when the optical fiber cable is bent.

The locking hole provided at the rear of the housing and the locking projection provided at the rear of the spring push are aligned on the same straight line as the locking hole provided at the front of the housing and the locking projection provided at the head of the spring push.

Out of the locking projections of the spring push respectively locked into the locking hole of the housing, a rear locking surface of the locking projection at the head of the spring bush is outwardly inclined in a rearward direction, and a front locking surface of the locking projection at the rear thereof is outwardly standing upright.

A distance between a rear side inner wall surface of the locking hole at the front of the housing and a front side inner wall surface of the locking hole at the rear thereof is somewhat shorter than a distance between a pointed end of the locking projection at the head of the spring push and a pointed end of the locking projection at the rear thereof.

A height of the locking projection at the rear of the spring push is formed to be lower than a height of the locking projection at the head thereof.

The coupling is provided on its right and left sides with an opening which is slid and aligned with the locking hole at the right and left sides of the housing, and the locking projection at the head of the spring push can be came off the locking hole of the housing by pushing a pressing tool into the opening.

Effect of the Invention

According to the present invention, the present invention enables the load caused by the bending stress to be prevented from being concentrated on each of the locking projections on both right and left sides at the head of the spring push when the protective boot is bent, for example, in the vertical direction or in the lateral direction, thereby improving the bending performance of the protective boot. Further, the present invention enables the spring push (the protective boot) to be securely prevented from accidentally coming off the housing. At the same time, the present invention enables unlocking of the spring push by merely pushing the locking projection after the coupling is slid in a backward direction to expose the existing locking projection at the head of the spring push to the opening provided in the coupling, as is conventionally done, when the spring push is disassembled from the housing.

Namely, in the present invention, at least a pair of locking holes and locking projections are respectively provided behind the locking hole at the front of the housing and the locking projection at the head of the spring push, and the load applied to the locking projection at the head of the spring push is distributed with the aid of the locking projection at the rear of the spring push when the optical fiber cable is bent. This enables an easy distribution of the load applied to the locking projection at the head of the conventional spring push when force is applied to the protective boot in a rotating direction by opposingly providing the locking projections at the rear of the spring push in addition to the locking projections at the head of the conventional spring push.

Since the locking hole provided at the rear of the housing and the locking projection provided at the rear of the spring push are arranged on the same straight line as the locking hole provided at the front of the housing and the locking projection provided at the head of the spring push, the present invention enables an acting force occurring incident to the load distribution to be prevented from applying to the different directions from each other at the front and rear sides of the spring push, and any extra load to be prevented from being generated in the spring push itself due to twisting thereof.

Out of the locking projections of the spring push to be respectively locked into the locking hole of the housing, the rear locking surface of the locking projection at the head of the spring push is outwardly inclined in the rearward direction, and the front locking surface of the locking projection at the rear thereof is outwardly standing upright. Thus, the present invention enables unlocking of the spring push by merely pushing the locking projection after the coupling is slid in a backward direction to expose the existing locking projection at the head of the spring push to the opening provided in the coupling, as is conventionally done, when the spring push is disassembled from the housing. Moreover, even in a case where the number of the locking projection is increased at the rear of the spring push, each of the rear locking projections at the rear of the spring push can be easily came off each of the locking holes by merely pushing the locking projection at the head of the spring push. This enables secure unlocking of the spring push from the housing 2.

The distance between the rear side inner wall surface of the locking hole at the front of the housing and the front side inner wall surface of the locking hole at the rear thereof is somewhat shorter than the distance between the pointed end of the locking projection at the head of the spring push and the pointed end of the locking projection at the rear thereof. Thus, even in a case where the exposed locking projection at the head of the spring push is pushed when on the spring push is unlocked from the housing at the time of disassembly thereof, a sufficient clearance can be secured with the aid of the locking projection at the rear of the spring push without being obstructed by the presence of the front side inner wall surface of the locking hole at the rear of the housing. This enables secure unlocking of the spring push from the housing.

The height of the locking projection at the rear of the spring push is formed to be lower than the height of the locking projection at the head of the spring push. Thus, even in a case where the number of the locking projection is increased at the rear of the spring push, each of the locking projections at the rear thereof can be easily came off each of the locking holes of the housing by merely pushing the locking projection at the head of the spring push. This enables secure unlocking of the spring push from the housing.

The coupling is provided at its right and left sides with the opening which is slid and aligned with the locking holes on the right and left sides of the housing, and the locking projection at the head of the spring push can be came off the locking hole by pushing the pressing tool into the opening. Thus, the present invention enables the coupling to slide in a rearward direction and to align the opening with the locking hole even while attaching the coupling, and the locking projection at the head of the spring push can be easily came off each of the locking holes simultaneously with the locking projection at the head thereof by pushing the pressing tool, for example, a pin or a rod, into the opening of the coupling. This enables secure unlocking of the spring push from the housing.

BRIEF DESCRIPTION OF DRAWINGS

FIGS. 1A and 1B show an optical connector according to an embodiment for carrying out the present invention, in which

FIGS. 2A to 2E show a state after the optical connector is assembled, in which

FIGS. 4A to 4E show an embodiment of a housing, in which

FIGS. 6A to 6E show an embodiment of a spring push, in which FIG. 5C is a front view, FIG. 6D is a rear view and FIG. 5E is a cross sectional view taken along line BB in FIG. 6B.

FIGS. 8A to 8D show an example of a disassembling method of an optical connector, in which

FIGS. 9A and 9B show an optical connector according to a prior art, in which

FIGS. 10A to 10E show an embodiment of a housing, in which

FIGS. 12A to 12E show an embodiment of a spring push, in which

DESCRIPTION OF EMBODIMENT

Hereinafter, a description will be given in detail of an embodiment of an optical connector according to the present invention with reference to the accompanying drawings. It is to be understood that while in the following description, a description is given of an MPO type push-pull optical connector 1 having a ferrule 3 for a multi-fiber connector using an optical fiber cable 3b, as mentioned later, any optical connector 1 using an alternative attaching and detaching method may be available, not necessarily limited thereto.

<Overall Structure of Optical Connector>

Figure 1A:
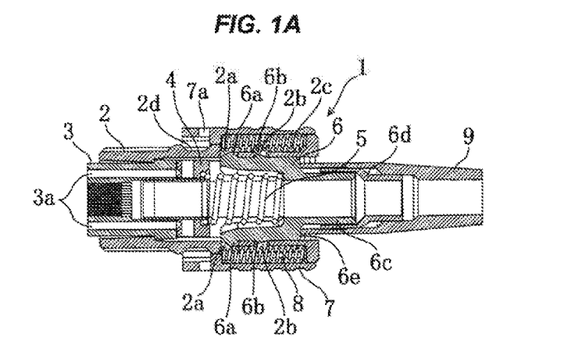
FIG. 1A is a cross sectional view in a state in which a protective boot is not bent.
Figure 1B:
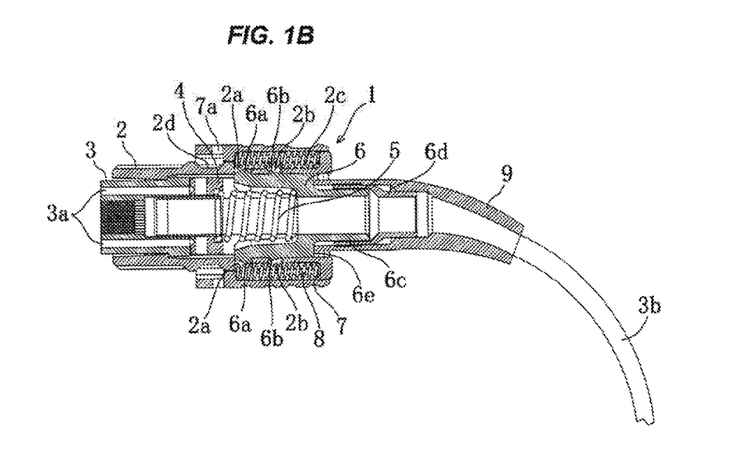
FIG. 1B is a cross sectional view in a state where the protective boot is bent.
Figure 2A:
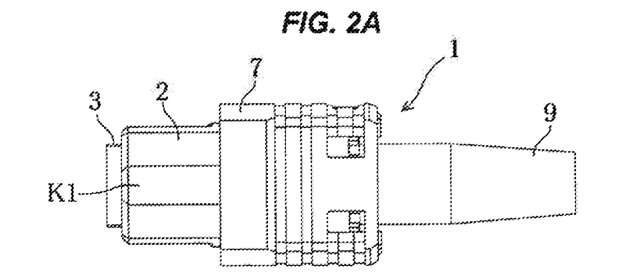
FIG. 2A is a plan view.
Figure 2B:
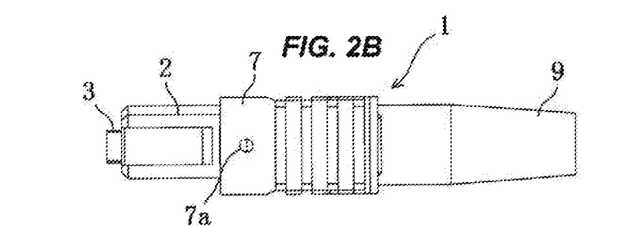
FIG. 2B is a side view.
Figure 2C:
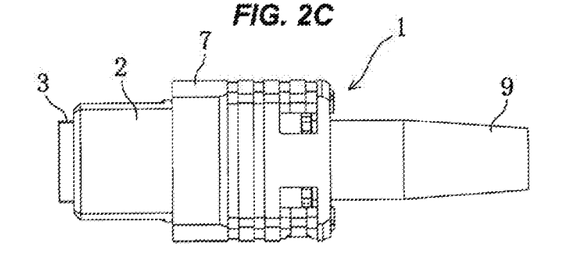
FIG. 2C is a bottom view.
Figure 2D:
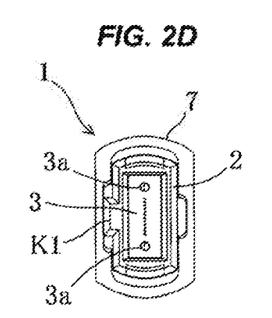
FIG. 2D is a front view and FIG. 2E is a rear view.
Figure 2E:
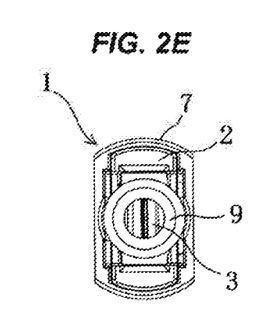
Figure 3:
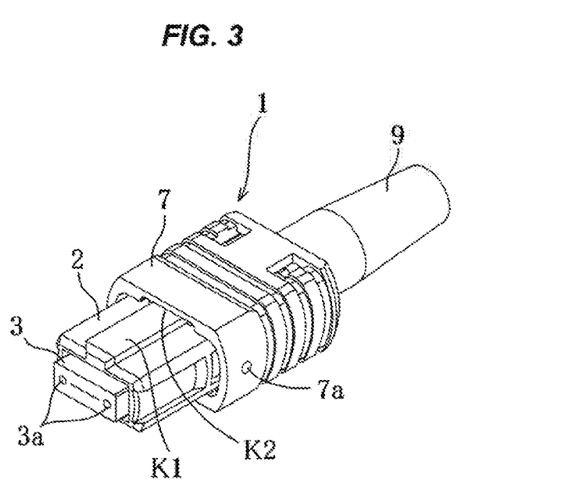
FIG. 3 is a perspective view showing a state after the optical connector is assembled.
Figure 4A:
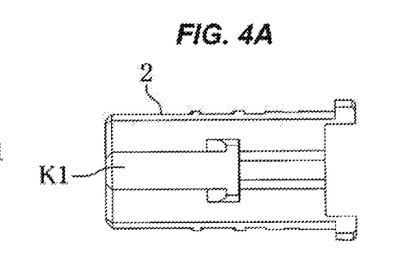
FIG. 4A is a plan view.
Figure 4B:
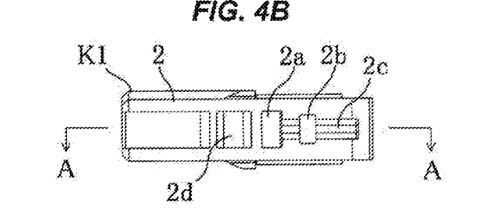
FIG. 4B is a side view.
Figure 4C:
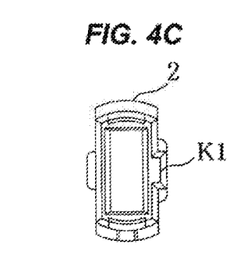
FIG. 4C is a front view.
Figure 4D:
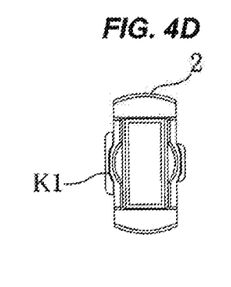
FIG. 4D is a rear view and FIG. 4E is a cross sectional view taken along line A-A in FIG. 4B.
Figure 4E:
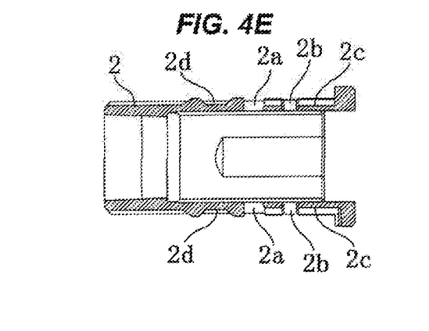
Figure 5:
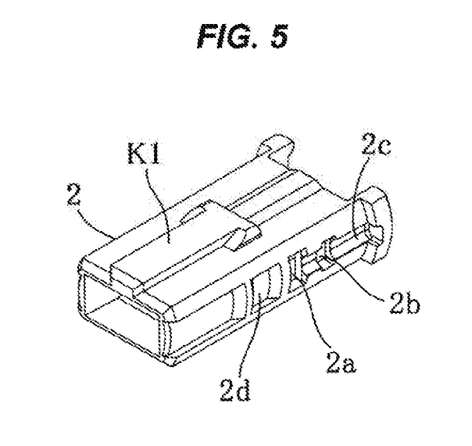
FIG. 5 is a perspective view showing an embodiment of the housing.

As shown in FIGS. 1A and 1B, the optical connector 1 includes a housing 2, a pin base 4, a coil spring 5, a spring push 6, a coupling 7 and a protective boot 9, and the housing 2 accommodates the ferrule 3 to which the optical fiber cable 3b (hereinafter, referred to as the optical fiber cable) is fixed. In the optical connector 1, the ferrule 3, a guide pin insertion hole 3a, the coupling 7 and the front of the housing 2 are set to the dimensions of an MPO connector complying with the JIS standards.

<Detailed Structure of Housing>

The housing 2 houses the ferrule 3 in its head, and extends a portion of the optical fiber cable 3b at the other end side from the rear end thereof. In other words, as shown in FIGS. 2A to 2E, FIG. 3, FIGS. 4A to 4E and FIG. 5, the housing 2 is formed into a tubular shape having a substantially rectangular cross section, and a pair of front and rear locking holes 2a and 2b are oppposingly formed along the same line on both sides at the front of the housing 2. Further, a concave groove 2c is formed on outer surface of both sides at the rear of the housing 2, and the concave groove 2c accommodates a spring 8 which urges the coupling 7 toward the head of the housing 2. Reference numeral 2d in the drawings denotes an engagement groove, and the engagement groove 2d engages with a locking projection provided in the optical connector that is a connection counterpart thereof. Further, a key projection K1, which is inserted into a key groove K2 (see FIG. 3) formed on an inner surface of the coupling 7, is formed on an outer surface of the head (the front end) of the housing 2.

<Detailed Structure of Spring Push>

As shown in FIGS. 6A to 6E, FIG. 7 and FIGS. 8A to 8D, the spring push 6 inserted into the housing 2 is formed into a substantially U-shape in a plan view and can be inwardly bent each other, and the same number of locking projections 6a and 6b as the locking holes 2a and 2b are oppposingly formed at each of portions of the head and the rear of the spring push 6 on the both right and left sides along the same line so as to be respectively locked into the locking holes 2a and 2b.

Figure 6A:
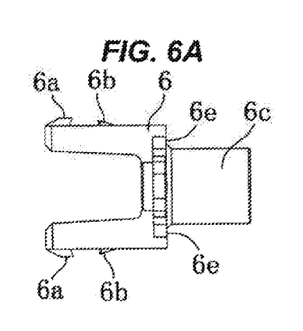
FIG. 6A is a plan view.
Figure 6B:
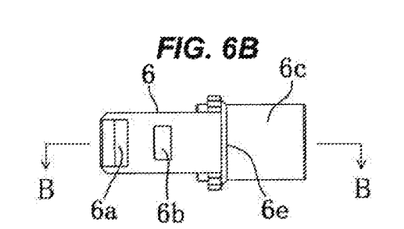
FIG. 6B is a side view.
Figure 6C:
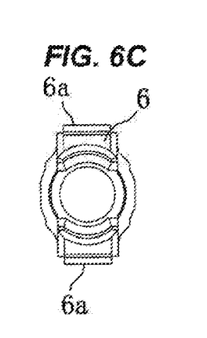
Figure 6D:
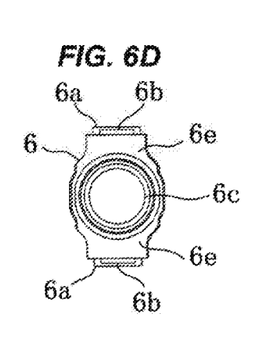
Figure 6E:
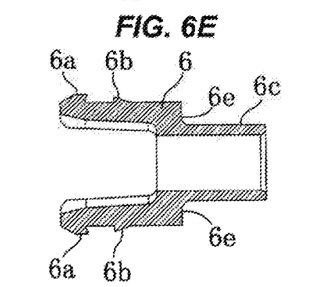
Figure 7:
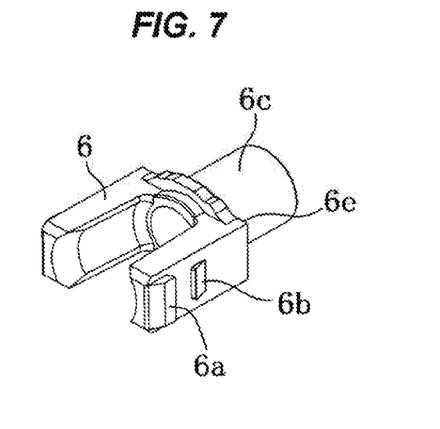
FIG. 7 is a perspective view showing an embodiment of the spring push.

As shown in FIG. 6E, out of the pair of front and rear locking projections 6a and 6b of the spring push 6 respectively locked into the locking holes 2a and 2b of the housing 2, a rear locking surface of the locking projection 6a at the head of the spring push 6 is outwardly inclined in a rearward direction, and has a substantially wedge shape whose pointed end is facing toward a diagonally backward direction in a plan view. Further, a front locking surface of the locking projection 6b at the rear of the spring push 6 is outwardly standing upright, and is formed into a substantially right angled triangle in a plan view.

Further, as shown in FIGS. 1A to 1B and FIGS. 8A to 8D, a distance between a rear side inner wall surface of the locking hole 2a at the front of the spring push 6 and a front side inner wall surface of the locking hole 2b at the rear thereof is somewhat narrower (shorter) than a distance between a pointed end of the locking projection 6a at the head of the spring push 6 and a pointed end of the locking projection 6b at the rear thereof.

In addition, a height of the locking projection 6b at the rear of the spring push 6 (a protruding height of a rear side claw) is formed to be lower than a height of the locking projection 6a at the head thereof (a protruding height of a leading end side claw).

Figure 8A:
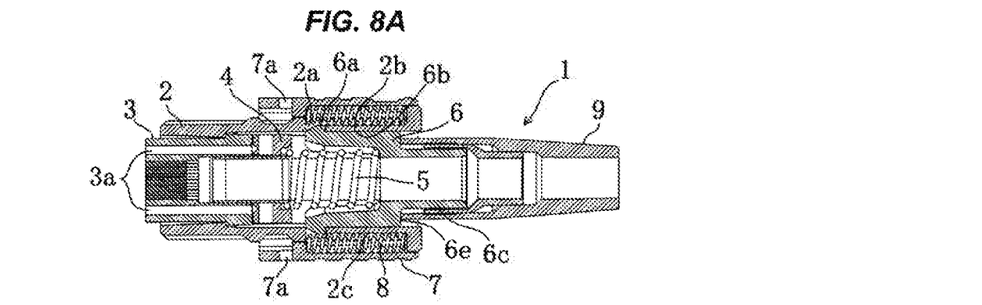
FIG. 8A is a cross sectional view showing a state before disassembling of a spring push.
Figure 8B:
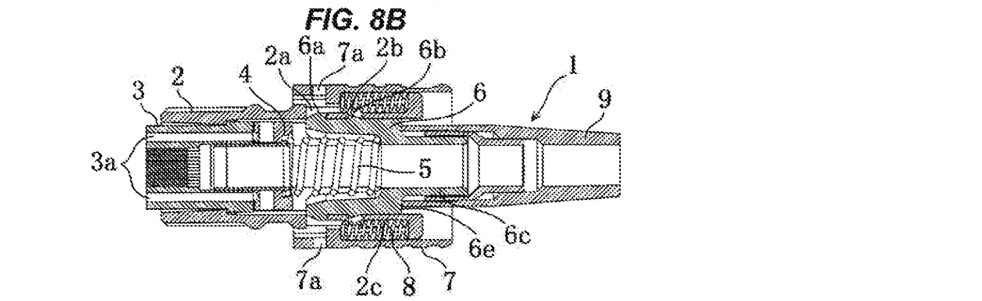
FIG. 8B is a vertical cross sectional view of a state where a coupling is slid in a rearward direction and a locking hole of a housing is aligned with an opening of the coupling.
Figure 8C:
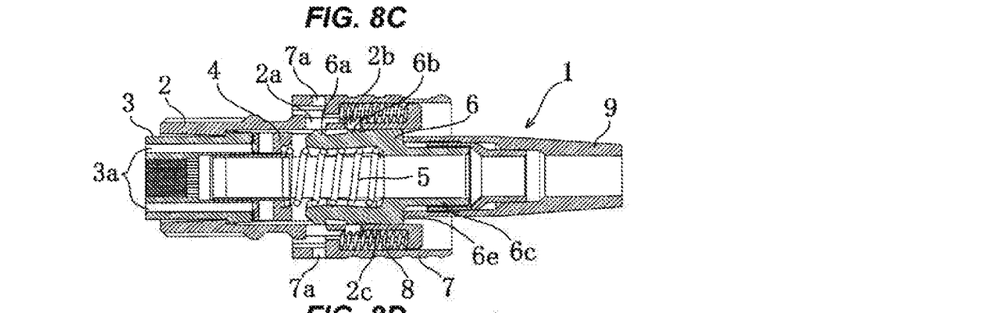
FIG. 8C is a vertical cross sectional view showing a state where a locking projection at the head of the spring push is pushed into the locking hole via the opening of the coupling.
Figure 8D:
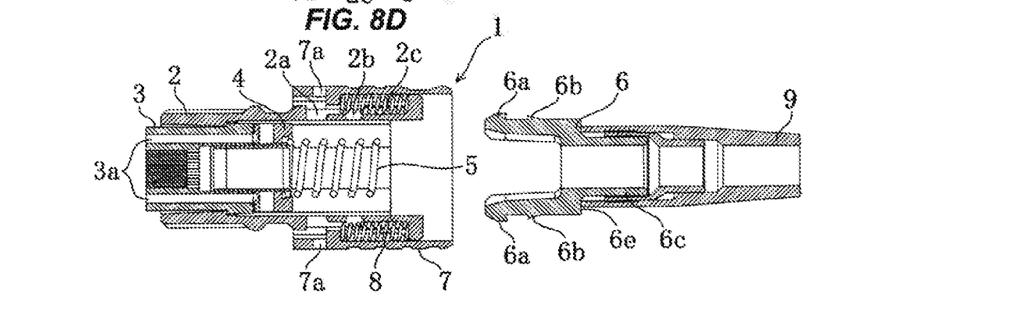
FIG. 8D is a vertical cross sectional view showing a state where the spring push is completely extracted.

When the spring push 6 is assembled with the housing 2, the spring push 6 is inserted from the rear end opening side of the housing 2 (see FIG. 8D). Then, the front inclined surface of the locking projection 6a at the head of the spring push 6 is pressed by an inner edge portion of the rear end opening of the housing 2, the substantially U-shaped portion of the spring push 6 is inserted thereinto while being inwardly bent each other, and the locking projections 6a and 6b are respectively engaged with the locking holes 2a and 2b (see FIGS. 8C, 8B and 8A). Thereafter, the spring 7 is accommodated in the concave groove 2c of the housing 2 and the coupling 7 is attached.

Meanwhile, as shown in FIGS. 8A and 8B, when the spring push 6 is disassembled from the housing 2, the coupling 7 is slid in a rearward direction and the opening 7a, for example, having a circular hole shape, which are formed on the right and left sides of the coupling 7, with the locking holes 2a on the right and left sides of the housing 2. After that, a pressing tool, such as, for example, a pin or a rod is simultaneously pressed into the opening 7a on the right and left sides of the coupling 7, and each of the locking projections 6a at the head of the spring push 6 is pressed thereby. Then, as shown in FIG. 8C, the substantially U-shaped portions of the spring push 6 are inwardly bent each other, so that the front and rear locking projections 6a and 6b are respectively came off the locking holes 2a and 2b, and pulled out from the housing 2 (see FIG. 8D).

The stepped fitting portion 6c is formed at the rear of the spring push 6, and the leading end of the protective boot is fitted to the fitting portion 6c via a tubular caulking ring 6d whose intermediate portion is stepwisely constricted. The protective boot 9 abuts at its leading end against the stepped surface 6e at the base of the fitting portion 6c, thereby restricting the spring push 6 from being displaced in a front direction of the spring push 6. Here, in a state in which the locking projections 6a and 6b of the spring push 6 are locked into the locking holes 2a and 2b of the housing 2, the fitting portion 6c of the spring push 6 is positioned within the housing 2 closer to the front side of the housing 2 than the rear end side thereof.

Further, the spring push 6 locked to the housing 2 retains the coil spring 5 such that the coil spring 6 does not come off the housing 2. Further, the coil spring 5 presses the ferrule 3 via the pin base 4 toward a fitting direction.

<Detailed Structure of Ferrule>

The ferrule 3 accommodated in the housing 2 is a ferrule 3 for a multi-fiber connector, and has at the rear thereof the optical fiber cable 3b. Further, the optical fiber cable 3b has a plurality of optical fiber cables, and an end surface of each of the optical fiber cables is provided in an end surface of the ferrule 3 in an exposed manner to form a connecting end surface. The optical fiber cable 3b is externally surrounded by the protective boot 9 and is attached to the housing 2 so as to extend in a rearward direction from the rear end of the housing 2.

Next, an example of the structure thus configured as above will be given to explain how to assemble, disassemble, and use the optical connector 1, and how it works. Here, the protective boot 9 is previously attached to the fitting portion 6C at the rear of the spring push 6 via the caulking ring 6d.

<Assembly Example of Spring Push>

In a case where the spring push 6 is assembled with the housing 2, the spring push 6 is inserted thereinto from the rear end opening side of the housing 2 (see FIG. 8D). Then, the front inclined surface of the front side locking projection 6a having a substantially wedge shape in a plan view is pressed by the inner edge portion of the rear end opening of the housing 2, and the substantially U-shaped portions of the spring push 6 are inserted into the housing 2 while being inwardly bent each other. Thus, the locking projections 6a and 6b of the spring push 6 are respectively engaged with the locking holes 2a and 2b of the housing 2 (see FIGS. 8C, 8B and 8A). Thereafter, the spring 8 is accommodated in the concave groove 2c of the housing 2 and the coupling 7 is attached.

<Disassembly Example of Spring Push>

In the meantime, as shown in FIGS. 8A and 8B, in a case where the spring push 6 is disassembled (unlocked) from the housing 2, the coupling 7 is slid in a backward direction and the opening 7a on the right and left sides of the coupling 7 is aligned with the locking holes 2a on the right and left sides of the housing 2. After that, the pressing tool, such as, for example, the pin or the rod is pressed simultaneously therewith into the opening 7a on the right and left sides of the coupling 7. Then, as shown in FIG. 8C, the substantially U-shaped portions of the spring push 6 are inwardly bent each other, so that the front and rear locking projections 6a and 6b are respectively came off the locking holes 2a and 2b and pulled out from the housing 2, and the spring push 6 is completely extracted therefrom (see FIG. 8D).

At this time, as shown in FIGS. 1A to 1B and FIGS. 8A to 8D, out of the locking projections 6a and 6b of the spring push 6 respectively locked into the locking holes 2a and 2b of the housing 2, the rear locking surface of the locking projection 6a at the front of the spring push 6 is outwardly inclined in a rearward direction, and the front locking surface of the locking projection 6b at the rear thereof is outwardly standing upright. At the same time, the distance between the rear side inner wall surface of the locking hole 2a at the front of the spring push 6 and the front side inner wall surface of the locking hole 2b at the rear thereof is somewhat narrower (shorter) than the distance between the pointed end of the locking projection 6a at the front of the spring push 6 and the pointed end of the locking projection 6b at the rear thereof. Therefore, even in a case where the number of the locking projection is increased at the rear of the spring push 6, it allows easy unlocking of the spring push 6 from the housing 2 by merely pushing the existing locking projection 6a at the front thereof, as is conventionally done, when the spring push 6 is disassembled from the housing 2.

Example of Use

When the optical connector 1 is used, for example, the optical fiber cable 3b of the optical connector 1 wired in the rear of a rack (not shown) in which an optical communication device is accommodated is bent in the vicinity of a backboard of the optical communication device, and is connected to an optical fiber cable (not shown) of an optical adapter (not shown) that is a connection counterpart thereof at the optical communication device side. At this time, since the rear locking projection 6b at the rear of the spring push 6 is oppositely provided in the spring push 6 in addition to the conventional locking projection 6a at the rear thereof, it allows a load distribution of the load applied to the locking projection 6a at the head of the spring push 6 when force caused by the bending (in a rotating direction) of the protective boot 9 is applied. For example, as shown in FIG. 1B, when the optical fiber cable 3b is bent in a downward direction in the drawing, the load is simultaneously applied to the locking projection 6a at head of the spring push 6 shown in an upper part of the drawing, and on the locking projection 6b at the rear thereof shown in a lower part of the drawing. For that reason, the load is distributed by the both upper and lower locking projections 6a and 6b. Incidentally, the same operation and effect may be exerted even when the optical fiber cable 3b is upwardly bent in the drawing.

The insertion of the optical connector 1 into the optical adapter (not shown) is achieved by a worker by pressing a portion positioned at the rear side of the housing 2 of the optical connector 1, for example, the protective boot 9 toward the optical adapter (not shown) with his or her hand or finger. At this time, since the coupling 7 is pressed and retreated by an opening edge of the optical adapter (not shown), the engagement groove 2d of the housing 2 engages with a locking projection (not shown) formed in an optical adapter that is a connection counterpart thereof.

Further, the extraction of the optical connector 1 from the adapter (not shown) is achieved by pulling in the coupling 7 to the rear side of the housing 2 against an elastic urging force of the spring 8.

Although not being exemplified, the present invention may be carried into effect with various changes and modifications added thereto, without departing from the scope of the present invention. For example, a plurality of locking holes 2b and a plurality of locking projections 6b may be provided alternatively at the rear of the housing 2 and the rear of the spring push 6, thereby improving distribution efficiency of the load applied to the locking projection 6b at the head of the spring push 6

As described above, the present embodiment enables the load caused by the bending stress to be prevented from being concentrated on the locking projection 6a at the head on the both right and left sides, when the protective boot 9 is bent, thereby improving the bending performance.

REFERENCE SIGNS LIST

K1 key projection
K2 key groove
1 optical connector
2 housing
2a, 2b locking hole
2c concave groove
2d engagement groove
3 ferrule
3a guide pin insertion hole
3b optical fiber cable
4 pin base
5 coil spring
6 spring push
6a, 6b locking projection
6c fitting portion
6d caulking ring
6e stepped surface
7 coupling
7a opening
8 spring
9 protective boot

The invention claimed is:

1. An optical connector comprising:
a ferrule to which one end of an optical fiber cable is fixed;
a housing having a front end and a rear end, a locking hole being provided at each of two opposite sides of the front end, wherein a head is defined at the front end, the ferrule is housed in the head and a at least a portion of an other end of the optical fiber cable extends from the rear end;
a coupling which is externally fitted to the housing, the coupling being slidable in a longitudinal direction of the housing and biased toward the front end;
a spring push which is internally inserted into the rear end of the housing, the spring push being provided at a front end with a locking projection to be locked into one of the locking holes at the front of the housing;
a protective boot which extends from the rear end of the housing, with a leading end thereof engaged with the spring push, at least a portion of the protective boot partly surrounding at least a portion of the other end of the optical fiber cable;
the coupling and the spring push being configured to lock the spring push to an elastic locking portion within an adapter by advancing the coupling; and
the coupling and the spring push being configured to unlock the spring push from the elastic locking portion within the adapter to allow the spring push to be pulled out from the housing by retreating the coupling,
wherein at least a pair of locking holes and locking projections are respectively provided behind the locking hole at the front of the housing and the locking projection at the front of the spring push, and
wherein a load applied to the locking projection at the head of the spring push is distributed with the aid of the locking projection at the rear thereof when the optical fiber cable is bent.

2. The optical connector according to claim 1, wherein the locking hole provided at the rear of the housing and the locking projection provided at the rear of the spring push are aligned on the same straight line as the locking hole provided at the front of the housing and the locking projection provided at the head of the spring push.

3. The optical connector according to claim 1, wherein a rear locking surface of the locking projection at the front of the spring push is outwardly inclined in a rearward direction, and a front locking surface of the locking projection at the rear thereof is outwardly standing upright.

4. The optical connector according to claim 1, wherein a distance between a rear side inner wall surface of the locking hole at the front of the housing and a front side inner wall surface of the locking hole at the rear thereof is shorter than a distance between a pointed end of the locking projection at the head of the spring push and a pointed end of the locking projection at the rear thereof.

5. The optical connector according to claim 1, wherein a height of the locking projection at the rear of the spring push is formed to be lower than a height of the locking projection at the head thereof.

6. The optical connector according to claim 1, wherein left and right sides of the coupling are provided an opening which is slid and aligned with the locking hole at the right and left sides of the housing, and the locking projection at the head of the spring push can be removed from the locking hole of the housing by pushing a pressing tool into the opening.

* * * * *